US012003306B2

(12) United States Patent
Oza et al.

(10) Patent No.: US 12,003,306 B2
(45) Date of Patent: Jun. 4, 2024

(54) USE OF POLYGONS TO SPECIFY BEAM SERVICE AREAS IN A SATELLITE COMMUNICATION SYSTEM (71) Applicant: Hughes Network Systems, LLC, Germantown, MD (US)

(72) Inventors: Rajeev Oza, Boyds, MD (US); Suresh Korada, Boyds, MD (US); Guy Montgomery, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 105 days.

(21) Appl. No.: 17/455,059

(22) Filed: Nov. 16, 2021

(65) Prior Publication Data
US 2022/0302987 A1 Sep. 22, 2022

Related U.S. Application Data (60) Provisional application No. 63/162,659, filed on Mar. 18, 2021.

(51) Int. Cl.
*H04W 16/28* (2009.01)
*H04B 7/06* (2006.01)
*H04B 7/185* (2006.01)

(52) U.S. Cl.
CPC ....... *H04B 7/0695* (2013.01); *H04B 7/18513* (2013.01); *H04W 16/28* (2013.01)

(58) Field of Classification Search
CPC .. H04B 7/0694; H04B 7/18513; H04W 16/28
See application file for complete search history.

(56) References Cited

U.S. PATENT DOCUMENTS

| 6,118,998 | A | 9/2000 | Wismer et al. |
| 6,421,526 | B1 | 7/2002 | Banno |
| 9,153,877 | B2 * | 10/2015 | Burr ...................... H01Q 1/288 |
| 9,680,559 | B1 * | 6/2017 | Freedman ............ H04B 7/1851 |
| 9,716,547 | B2 * | 7/2017 | Roos .................. H04B 7/18528 |
| 9,748,989 | B1 * | 8/2017 | Freedman ................ H04B 1/12 |
| 9,985,706 | B1 * | 5/2018 | Freedman ............ H04B 7/1851 |
| 10,004,073 | B1 * | 6/2018 | Freedman ............ H04B 7/1851 |
| 10,498,378 | B1 * | 12/2019 | Freedman ................ H04B 1/12 |

(Continued)

FOREIGN PATENT DOCUMENTS

WO 2020092566 6/2021

OTHER PUBLICATIONS

International search report for PCT Application No. PCT/US2022/071128.

*Primary Examiner* — Hai V Nguyen
(74) *Attorney, Agent, or Firm* — Capitol City TechLaw; Jasbir Singh (57) ABSTRACT

A system and method for selecting a beam from satellite beams to communicate with a terminal at a location. The method includes dividing a satellite coverage area into beam service areas (BSAs) for a satellite network, where each of the BSAs is associated with a respective beam information; selecting, with a computer, a select BSA from the BSAs based on the location; and communicating between the terminal and a gateway using a beam. In the method, the location is located in the select BSA, the beam is identified by the respective beam information associated with the select BSA, and the BSAs define a boundary having a closed polygon shape.

20 Claims, 4 Drawing Sheets (56) References Cited

U.S. PATENT DOCUMENTS

| | | | |
|---|---|---|---|
| 10,750,503 B1* | 8/2020 | Freedman | H04W 72/563 |
| 11,133,860 B2* | 9/2021 | Liddell | H04B 7/2041 |
| 11,165,491 B2* | 11/2021 | Arur | H04B 7/18545 |
| 11,923,961 B2* | 3/2024 | Liddell | H04B 7/0408 |
| 2013/0154874 A1* | 6/2013 | Burr | H01Q 25/007 |
| | | | 342/188 |
| 2015/0229385 A1* | 8/2015 | Roos | H04B 7/18508 |
| | | | 370/317 |
| 2020/0212996 A1* | 7/2020 | Liddell | H04B 7/18513 |
| 2020/0213000 A1* | 7/2020 | Arur | H04B 7/1851 |
| 2021/0249767 A1* | 8/2021 | Greenwood | H01Q 21/061 |
| 2022/0038173 A1* | 2/2022 | Liddell | H04B 7/18513 |
| 2022/0052753 A1* | 2/2022 | Speidel | H04W 16/10 |

\* cited by examiner

USE OF POLYGONS TO SPECIFY BEAM SERVICE AREAS IN A SATELLITE COMMUNICATION SYSTEM

RELATED APPLICATIONS

The present application claims benefit from earlier filed U.S. Provisional Application No. 63/162,659, filed Mar. 18, 2021, which is incorporated by reference in its entirety for all purposes.

FIELD

The present teachings disclose using a polygon shaped Beam Service Area (BSA) to specify beam boundaries. As such, beam selection may be performed by a terminal locally, by a central entity or by an external entity. The present teachings allow use of a different spectrum depending on which BSA a terminal lies in for an area covered by a satellite beam.

BACKGROUND

The prior art defines satellite beams as ellipses in a satellite coordinate system. Some beams that are not conformant to this shape may be built using constituent ellipses to make up that beam. This approach fails to provide fully flexible arbitrary beam boundaries. One example of need for such a beam boundary may be a jurisdiction boundary, for example, a country border specific boundary.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for selecting a beam from satellite beams to communicate with a terminal at a location. The method includes dividing a satellite coverage area into beam service areas (BSAs) for a satellite network, where each of the BSAs is associated with a respective beam information; selecting, with a computer, a select BSA from the BSAs based on the location; and communicating between the terminal and a gateway using a beam. In the method, the location is located in the select BSA, the beam is identified by the respective beam information associated with the select BSA, and the BSAs define a boundary having a closed polygon shape. Other embodiments of this aspect include corresponding computer systems, apparatus, and computer programs recorded on one or more computer storage devices, each configured to perform the actions of the methods.

Implementations may include one or more of the following features. The method where the select BSA coincides with a country boundary. The method where a plurality of the BSAs are located within a country boundary. The method where one of the BSAs includes a no-transmit region due to the respective beam information identifying an unavailable beam. The method where the beam spans multiple BSAs of the BSAs with a minimum effective isotropic radiated power (EIRP). The method may include denying communications with the beam to the terminal when the location is outside the select BSA. The method where a first BSA of the BSAs is enclosed by a second BSA of the BSAs. The method where the terminal is one or more of an aeronautical, a maritime or a mobile terminal. The method where the selecting includes performing a point-in-polygon test on the location. The method where the selecting includes is performed by the terminal. The method where the selecting is performed at an external beam selector. The method where the selecting is based on a characteristic of the terminal selected from one or more of a heading, a speed, a beam definition plan version, an antenna directivity, a radome, a skew angle, and a terminal identification. The method where the respective beam information may include one or more of the location, a service agreement, a terminal capability, a beam modulation, a terminal provisioning and a beam identifier. The method may include sending the respective beam information to the terminal. The method may include predicating a beam switch when a future path of the terminal approaches a boundary of the select BSA. The method may include deferring a beam switch when a future path of the terminal approaches a boundary of the select BSA and the future path remains within a boundary area defined by the boundary and an inner boundary of the select BSA. Implementations of the described techniques may include hardware, a method or process, or computer software on a computer-accessible medium.

One general aspect includes a system to select a beam from satellite beams to communicate with a terminal at a location. The system includes a satellite coverage area divided into beam service areas (BSAs) for a satellite network, where each of the BSAs is associated with a respective beam information; a beam selector to select a select BSA from the BSAs based on the location; and a transceiver to communicate between the terminal and a gateway using a beam, where the location is located in the select BSA, the beam is identified by the respective beam information associated with the select BSA, and the BSAs define a boundary having a closed polygon shape. Other embodiments of this aspect include corresponding computer systems, apparatus, and computer programs recorded on one or more computer storage devices, each configured to perform the actions of the methods.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

In a satellite communication system, a terminal may switch from a first beam to a second beam based on the service regions of the first and second beams. The switch may be within a satellite, from one satellite to the another, within a gateway, or from one gateway to another. The switch may be caused by a relative movement between the terminal and the satellite; the entity in motion may be the terminal or the satellite. Prior to switching, the terminal or the gateway may determine availability of a beam in the terminal's location. In some embodiments, mobile or fixed terminals may be serviced by a selected beam from multiple beams servicing a terminal's location. The beam selection may be determined by a gateway or the terminal. The beam selection may be based on one or more of a terminal's location, a service agreement, a terminal capability, a beam modulation, terminal provisioning or the like. The beam selection may be based on the terminal's ability to acquire a beam lock with the selected beam.

In existing systems, a beam's shape on the ground is approximated by an elliptical area within a satellite's coverage area. A typical beam definition is in a satellite centric (Center of Box) angular coordinate system. Some beams are defined using multiple virtual beams, where each of the virtual beams has an elliptical boundary. As such, a beam boundary of the combined virtual beams (the actual beam or a resulting beam) may be non-elliptical. The beam boundary defines a beam's coverage area; the beam boundary is not an actual boundary of the RF signals defining a beam. By using polygons to define a beam boundary, the present teachings avoid the need to define virtual beams for beam boundary shaping purpose. In some embodiments, polygon shaped beam boundaries for virtual beams may be used to sub-partition a polygon shaped beam boundary, for example, for bandwidth partitioning or the like.

Polygon shaping of beam boundaries allows for non-standard shaping of beam boundaries to cater to a regional limit, for example, limits that are country specific, a service provider's service boundary, beam selection in overlapping service areas of beams. The present teachings allow for a more precise way to specify switching points in overlap regions of coverage areas of beams. Beam selection may be performed at the terminal, at a central entity (such as, a gateway), or by an entity external to the communication services provider.

The present teachings are applicable to any multi beam, satellite based or other, communication system that has fixed terminals, aeronautical terminals, maritime terminals or any type of mobile terminals. The mobile terminals may be aeronautical terminals, maritime terminals, terminals on trains, buses, or any other mobile terminal. A gateway may be a device that has an RF link to the satellite to transmit and receive data from terminals, and has terrestrial or other connectivity to link the terminals to the internet.

In the present teachings, a network may be a coverage area of beams of one or more satellites linked to one or more gateways that may provide service to terminals in the coverage area. The network may be managed by a Network Management System (NMS). A Network Access Point (NAP) maybe an access point to the internet for the network. There may be one or more NAPs in the network. The network may use a Centralized Beam Selector (CBS) or an External Beam Selector (EBS).

A beam selector for the network may use a Beam Definition Plan (BDP). The BDP may a service plan level configuration for a group of terminals. The BDP may define a Beam Service Area (BSA) with a polygon shape; a minimum EIRP of the beam is not limited by the polygon-shapes of the BSA. A terminal may be serviced by the beam only when its location is within the BSA polygon.

Figure 1:
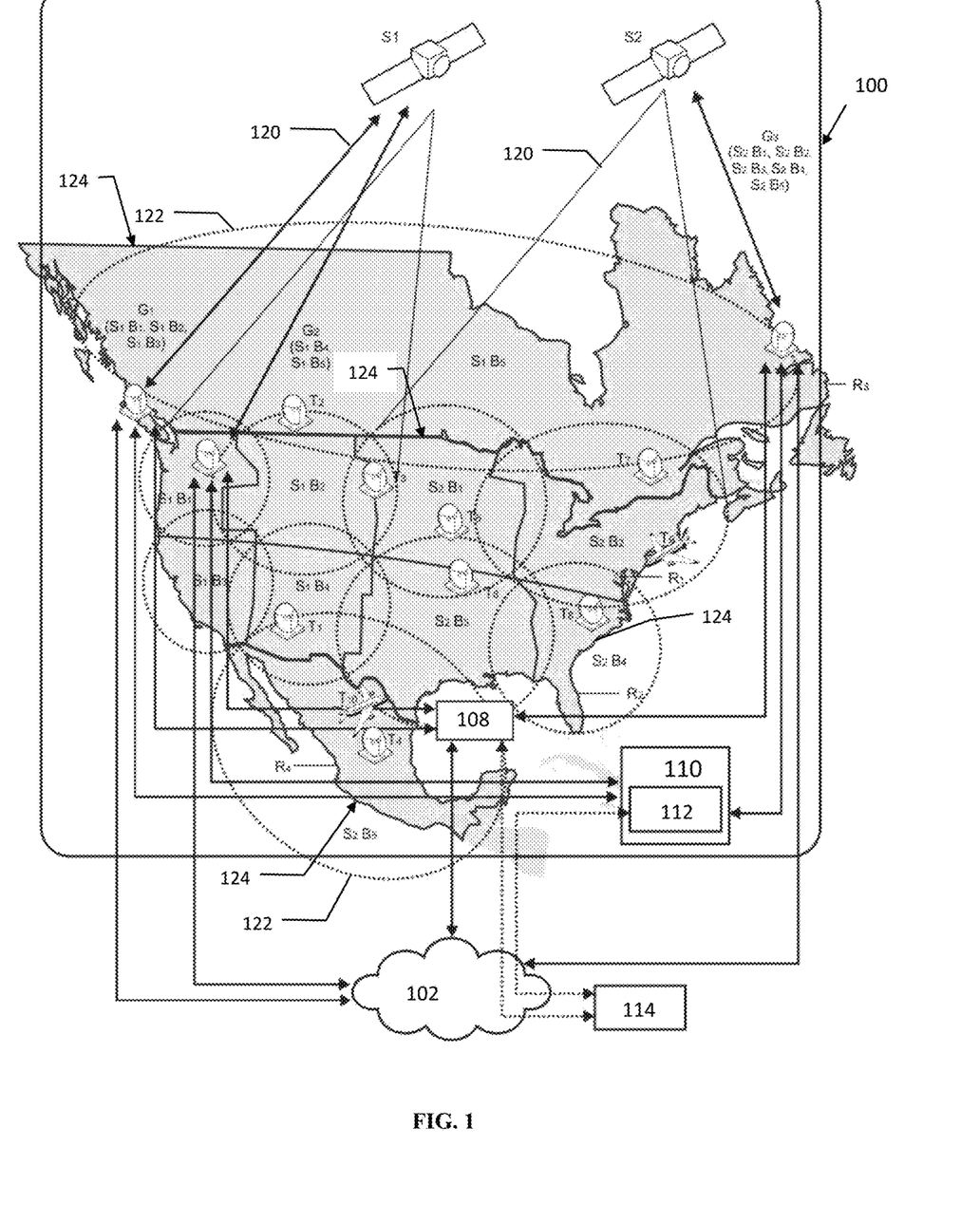
FIG. 1 illustrates an exemplary network with multiple spot beams covering service area according to various embodiments.

FIG. 1 illustrates an exemplary network with multiple spot beams covering service area according to various embodiments.

FIG. 1 illustrates a communication network 100 including an NMS 110, a NAP 108, a satellite $S_1$, a satellite $S_2$, a gateway $G_1$, a gateway $G_2$, a gateway $G_3$ and terminals $T_1$-$T_{10}$. The satellites $S_1$ and $S_2$ radiate beams 120, with an EIRP above some required minimum, over a satellite coverage area 108 (portions of Canada, United States and Mexico in FIG. 1). Each of the beams 120 provide communications for terminals disposed in a respective beam coverage area 122 (dotted lines) over which the beam 120 has an EIRP above some required minimum. The satellite coverage area 108 may be divided into BSAs 124. Boundaries of the beam coverage areas 122 may not align with BSAs 124 ($R_1$, $R_2$, . . . $R_{11}$). The BSAs 124 may be polygon-shaped (closed polygons), while the beam coverage areas 122 may generally be elliptical on the ground.

Even though beams 120 provide the minimum EIRP necessary within an associated one of the beam coverage areas 122, the BSAs 124 may be limited, for example, by the NMS 110, for one or more of the beams 120. Each of the BSAs 124 may be associated with one of the beams 120. The BSAs 124 may be surrounded by one of the beam coverage areas 122. In some embodiments, one of the BSAs 124 may be outside the associated beam coverage area 122. For example, beam $S_1B_5$ is associated with a BSA $R_3$ that maps to Canada; terminals (such as $T_7$) disposed in portions of $R_3$ that lie outside a beam coverage area of $S_1B_5$ may use beam $S_1B_5$ via a larger antenna or the like.

The BSAs 124 covered by beams 120 of the satellite $S_1$ may be served by Gateway $G_1$ and Gateway $G_2$. Beams 120 of satellite $S_1$ are identified as $S_1B_1$, $S_1B_2$, $S_1B_3$ (served by Gateway $G_1$) and $S_1B_4$ and $S_1B_5$ (served by Gateway $G_2$). The BSAs 124 covered by beams 120 of the satellite $S_2$ are identified as $S_2B_1$, $S_2B_2$, $S_2B_3$, $S_2B_4$ and $S_2B_5$, all served by Gateway $G_3$. Gateways $G_1$, $G_2$ and $G_3$ may be connected to a NAP 108 to connect the terminals $T_1$-$T_{10}$ to the cloud/internet 102.

In the example of FIG. 1, terminals $T_9$ and $T_{10}$ are mobile terminals and terminals $T_1$ to $T_8$ are fixed terminals. Connectivity to the cloud/internet 102 for terminals $T_1$-$T_{10}$ may be provided by the NAP 108. Generally, one or more NAPs may be co-located with a gateway. However, as a mobile terminal moves/switches from one beam to another beam, the terminal may have to associate with a different gateway and may be a different satellite. As the mobile terminal switches gateways, the mobile terminal may maintain its association with the NAP associated with the prior (original) NAP and maintain connections from the mobile terminal to a cloud/internet 102.

Selection of one of the beams 120 to service a terminal may be based on an associated BSA of the BSAs 124 surrounding the terminal's location. A terminal receiving the minimum EIRP from one of the spot beams may lock onto a spot beam regardless of the terminal's location. Beam selection in the communication network 100 may be performed by a beam selector such as, a terminal, a CBS 112 and/or an EBS 114.

According to various embodiments of the present disclosure there are several methods of operations for beam selection. The terminals, $T_1$-$T_{10}$, may select a beam, for example, with a beam selection protocol, locally to obtain a beam selection result. In some embodiments, a terminal (for example, mobile terminals) may periodically send a location update to the CBS 112 to obtain a beam selection based on the location of the mobile terminal, the boundaries and the spot beams the mobile terminal is configured to use. In some embodiments, an EBS 114 may be included. In one embodiment, the CBS 112 may interface with the EBS 114 to provide input for the beam selection. In some embodiments, the EBS 114 may provide the beam for the terminal, and the CBS 112 may provide that information to the terminal.

A terminal may perform a beam selection using the beam selector during a commissioning phase, when moving from one satellite/gateway to another, when moving from one BSA to another, or the like. As a terminal approaches a boundary of a service provider's service area, the terminal may request a configuration for operation in a visitor network that is adjacent the terminal's home network. The terminal may subsequently communicate with a beam selector of the visitor network while outside the coverage area of the home network. This communication may be sent over a common access channel. the beam selector may determine which BSA a terminal is in by using, for example, a point-in-polygon test algorithm, ray casting or winding number algorithms.

The input to a beam selector may include, but is not limited to, location, heading, Beam Definition Plan (BDP) version, speed, and the like. A BDP version may encapsulate information about which beams a terminal is permitted to get service from, beam boundary definitions, region polygons, etc. for the terminals and satellites in a network coverage area. There may be one or more beams within a BSA. The BDP of the beams 120 may include polygon definitions for the BSAs 124. The beam definition areas are for illustration of this specific example and may be defined as needed.

Some of the beam polygon definitions of the BSAs follow country specific boundaries, for instance, BSAs associated with beams $S_1B_5$ for Canada and $S_2B_5$ for Mexico, respectively. The coverage area for the USA is split into eight BSAs that are served by associated beams, namely, $S_1B_1$ through $S_1B_4$, and $S_2B_1$ through $S_2B_4$.

A coordinate system may be utilized to define the polygons. Some possible options for the coordinate system are latitude/longitude pairs, earth-centered earth-fixed ("ECEF") coordinate system, satellite centered angular coordinate system, and the like. Conversion of points from one coordinate system to another may be done to suit specific implementation needs. In some embodiments, a definition of the BSA may explicitly include a last node that is the same as the first node. In some embodiments, there may be an implicit assumption that each BSA is a closed polygon and there is a line connecting the first and last points of the polygon to close the polygon. The points may be either specified in order or may include an identifier specifying the order.

The beam selection is based on the BSA that surrounds the terminal. When a terminal lies in an overlap of beam communication areas, for example, terminal $T_1$ is in an overlap of beam communication areas for beams $S_1B_4$ and $S_2B_5$. In FIG. 1, the beam selection, based on the BSAs, will select $S_1B_4$ for terminal $T_1$ as its location is surrounded by the BSA associated with $S_1B_4$, and use resources from there. Similarly, terminal $T_2$ is positioned in two beam communication areas, $S_1B_2$ and $S_1B_5$, one being served by $G_1$ and the other being served by $G_2$, respectively. Based on a polygon shaped beam boundary of the BSAs, the beam selector will select beam $S_1B_5$ to service terminal $T_2$ via $G_2$.

As illustrated in FIG. 1, some BSAs associated with a beam, like BSA 124' associated with beam $S_1B_5$, may have boundaries stretching beyond a beam communication area of the associated beam. This stretched communication can be done if desired by a network operator. For example, those BSAs can be served by utilizing a separate beam and antennae with larger gain and/or a more powerful transceiver when a terminal is located in BSAs outside the associated beam's communication area of a beam.

Figure 2A:
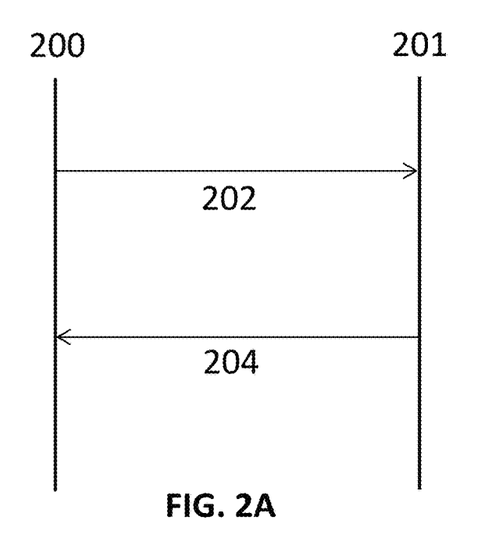
FIG. 2A illustrates a terminal response method according to various embodiments.
Figure 2B:
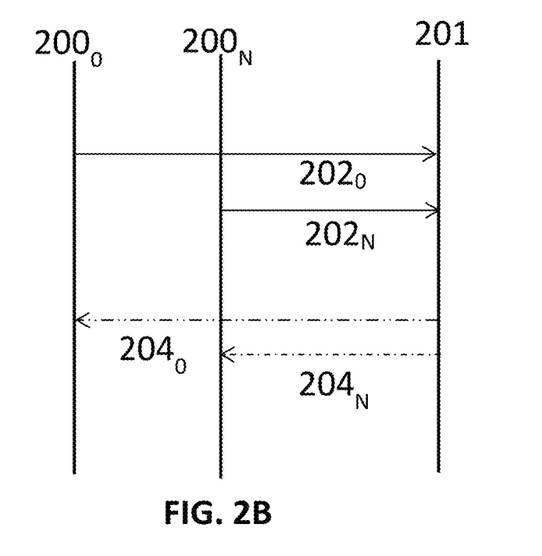
FIG. 2B illustrates a broadcast/multicast response method according to various embodiments.
Figure 2C:
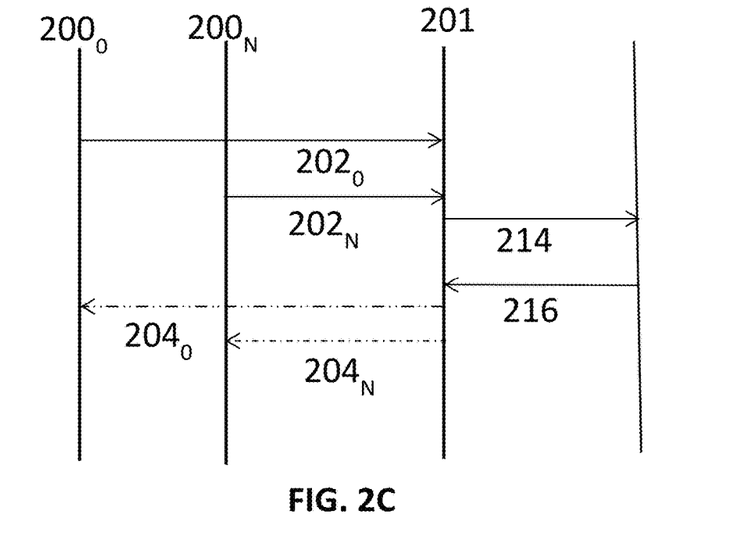
FIG. 2C a broadcast/multicast response method with an EBS according to various embodiments.

The respective methods as exemplified in FIG. 2A, FIG. 2B and FIG. 2C can be utilized independently for groups of terminals in the network.

FIG. 2A illustrates a terminal response method according to various embodiments.

FIG. 2A shows a beam selector 201 using a terminal response method. A terminal 200 sends a data update 202 to a beam selector 201. In some embodiments, the beam selector 201 may embody a terminal implementation, a CBS or a EBS. In a terminal implementation, the beam selector may perform the beam selection on the terminal without need for messaging external to the terminal. The data update 202 may include a terminal's information including location, heading, speed, beam configuration version and the like. The beam selector 201 may send a beam selection result 204 to the terminal 200. The beam selection result 204 may include a beam identifier and/or a beam definition including a beam boundary definition, beam frequency, orthogonality, terminal ID and the like.

FIG. 2B illustrates a broadcast/multicast response method according to various embodiments.

FIG. 2B illustrates a beam selector 201 using a broadcast or multicast method for sending responses back to terminals $200_0$ thru $200_N$. In some embodiments, when a large number of terminals are sending messages simultaneously to the beam selector 201, and the beam selector 201 may group the sending of the beam selection result 204 as a multicast. The beam selector 201 may embody a CBS and/or EBS. The beam selector 201 may group a number of data updates $202_0$ to $202_N$ together and periodically send the broadcast messages $204_0$ to $204_N$ to terminals $200_0$ thru $200_N$. In some embodiments, the broadcast messages $204_0$ to $204_N$ may be sent as a multicast message. For instance, the beam selector 201 may group the broadcast messages $204_0$ to $204_{N-x}$ (with x being a positive integer) for terminals $200_0$ to $200_{N-x}$ in one multicast response, and then group responses for terminals $200_{N-x+1}$ to $200_N$ into a subsequent multicast/broadcast response. In the Figures, the broadcast or multicast messages are indicated using dashed lines. This approach can conserve messaging bandwidth. The respective methods as exemplified in FIG. 2A and FIG. 2B can be utilized independently for groups of terminals in the network.

FIG. 2C a broadcast/multicast response method with an EBS according to various embodiments.

FIG. 2C illustrates a beam selector 201 using a broadcast or multicast method for sending responses back to terminals $200_0$ thru $200_N$. In the illustrated method, the beam selector 201 may send a group data update 214 to the EBS 114 based on the data updates $202_0$ to $202_N$. The sending of the group data update 214 may be periodic, sent after a timer has expired, or when a count of unsatisfied data updates exceeds a threshold. The EBS 114 may select beams for each terminal included in the group data update 214 to generate a group selection result 216. The group selection may be sent to the beam selector 201 via broadcast or multicast response back to the terminals. The beam selector 201 may group a number of terminal responses together and periodically send broadcast messages $204_0$ to $204_N$ to terminals $200_0$ thru $200_N$. In some embodiments, the broadcast messages $204_0$ to $204_N$ may be sent as a multicast message. For instance, the beam selector 201 may group the broadcast messages $204_0$ to $204_{N-x}$ (with x being a positive integer) for terminals $200_0$ to $200_N$, in one multicast response, and then group the broadcast messages $204_{N-x+1}$ to $204_N$ for terminals $200_{N-x+1}$ to $200_N$.

According to various embodiments of the present teachings, a terminal can communicate with a satellite (not shown) in an overlapping communication area (illustrated as a dotted line). More than one beam may exceed the minimum EIRP requirement for a terminal located in the overlapping communication area. Different terminals located in the overlapping communication area may have different beam definition plans. In this scenario, beam selection may be the BSA within which a respective terminal lies in. The determination may select the beam associated with the BSA. In some embodiments, the beam selection may also be determined by the BDP of each terminal.

Figure 3A:
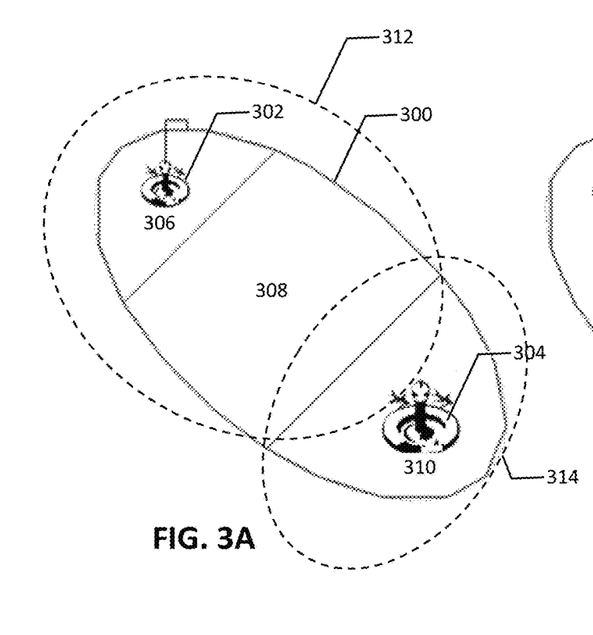
FIG. 3A illustrates beam selection for a terminal in an overlapping communication area of beams according to various embodiments.

FIG. 3A illustrates beam selection for a terminal in an overlapping communication area of beams according to various embodiments.

An overlapping communication area 300 may be divided into three BSAs, namely, 306, 308, 310. An airport 302 may be located in BSA 306. An airport 304 may be located in BSA 310. A terminal (not shown), herein a mobile terminal, may communicate with a satellite (not shown) and may be located in one of the planes around airports 302, 304. Airport 304 may be considered to have higher traffic and a beam 314 associated with a surrounding BSA 310 may be provided dedicated bandwidth resources, for example, all the bandwidth in that beam for that polarization. Beam 312 for BSAs 306, 308 may be assigned bandwidth resources of a different polarization. Resources of beam 312 may be divided between BSAs 306, 308 by allocating portions of a beam carrier, time slots, or the like of beam 312 between BSAs 306, 308 as needed by the terminals located therein. This arrangement allows for flexibility of bandwidth and resource allocations to be either shared or dedicated. In some embodiments, beams for BSAs 306, 308, 310 may be served by a common gateway or different gateways.

Figure 3B:
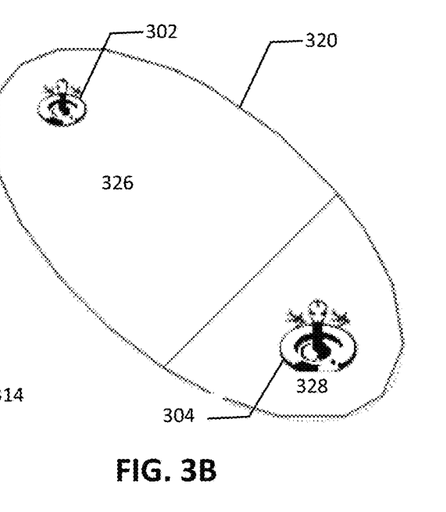
FIG. 3B illustrates beam selection for a terminal in an overlapping communication area of beams according to various embodiments.

FIG. 3B illustrates beam selection for a terminal in an overlapping communication area of beams according to various embodiments.

An overlapping communication area 320 may be divided into BSAs 326, 328. This arrangement may allow for transmission resources to be shared by terminals in the larger BSA 326 while providing a dedicated beam for the BSA 328 surrounding airport 304.

Figure 4:
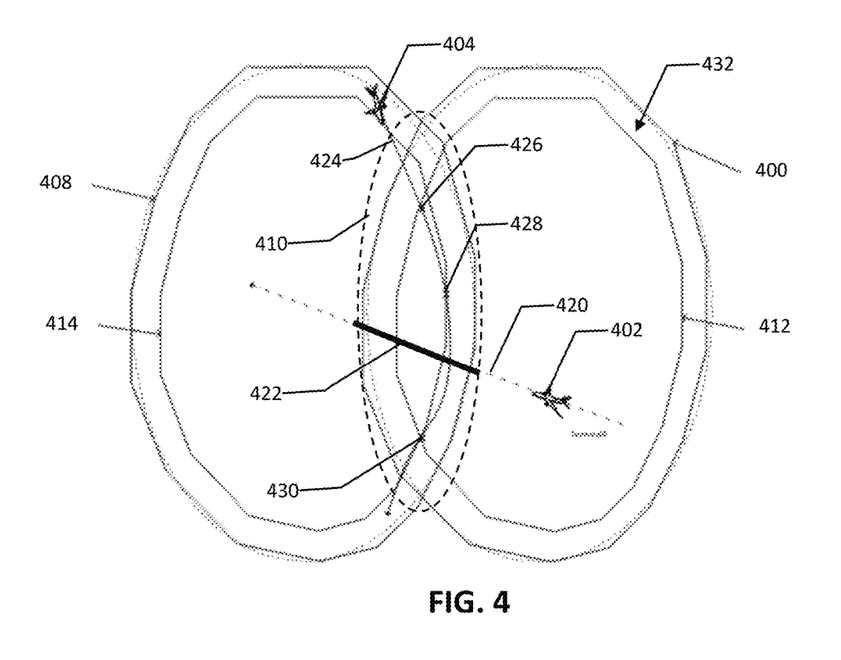
FIG. 4 illustrates exemplary beam service areas that overlap according to various embodiments.

FIG. 4 illustrates exemplary BSAs that overlap according to various embodiments.

Two BSAs 400, 414 may overlap to define an overlapping region 410. The overlapping region 410 may prevent avoidable switching between beams for a moving terminal. An inner boundary 412 may be defined for BSA 400. An inner boundary 408 may be defined for BSA 414. An area between a boundary of BSA 400 and the inner boundary 412 may define a boundary area 432. Terminal 402 (located in plane for example) is heading from BSA 400 towards BSA 414. A portion 422 (solid line) of a future path 420 may be a potential switching area for the terminal 402. The beam switch may depend on configured preferences and other parameters mentioned above. For terminal 404, based on a future path 424, potential beam switch spots 426, 428, 430 may be avoided due to the inner and beam area boundary definitions. The size of the overlap region 410 may vary and whether switchovers can be avoided will depend on configuration and specific travel paths. In yet another embodiment, the beams can be positioned so that only outer boundary polygons of the respective beams overlap.

A beam selector may consider the inner boundary, the beam area boundary and a future path for a terminal prior when initiating or deferring a beam switch. A beam selector may consider between the beams associated with the BSAs that overlap. The respective beams of the overlapping BSAs may have different loading and preference characteristics. All or some of these parameters, in conjunction with a terminal's direction of movement and heading properties, may be considered by the beam selector in determining whether and when to switch between the respective beams of the overlapping BSAs. The overlapping BSAs may be served by the same or different satellites, and by the same or different gateways.

Figure 5:
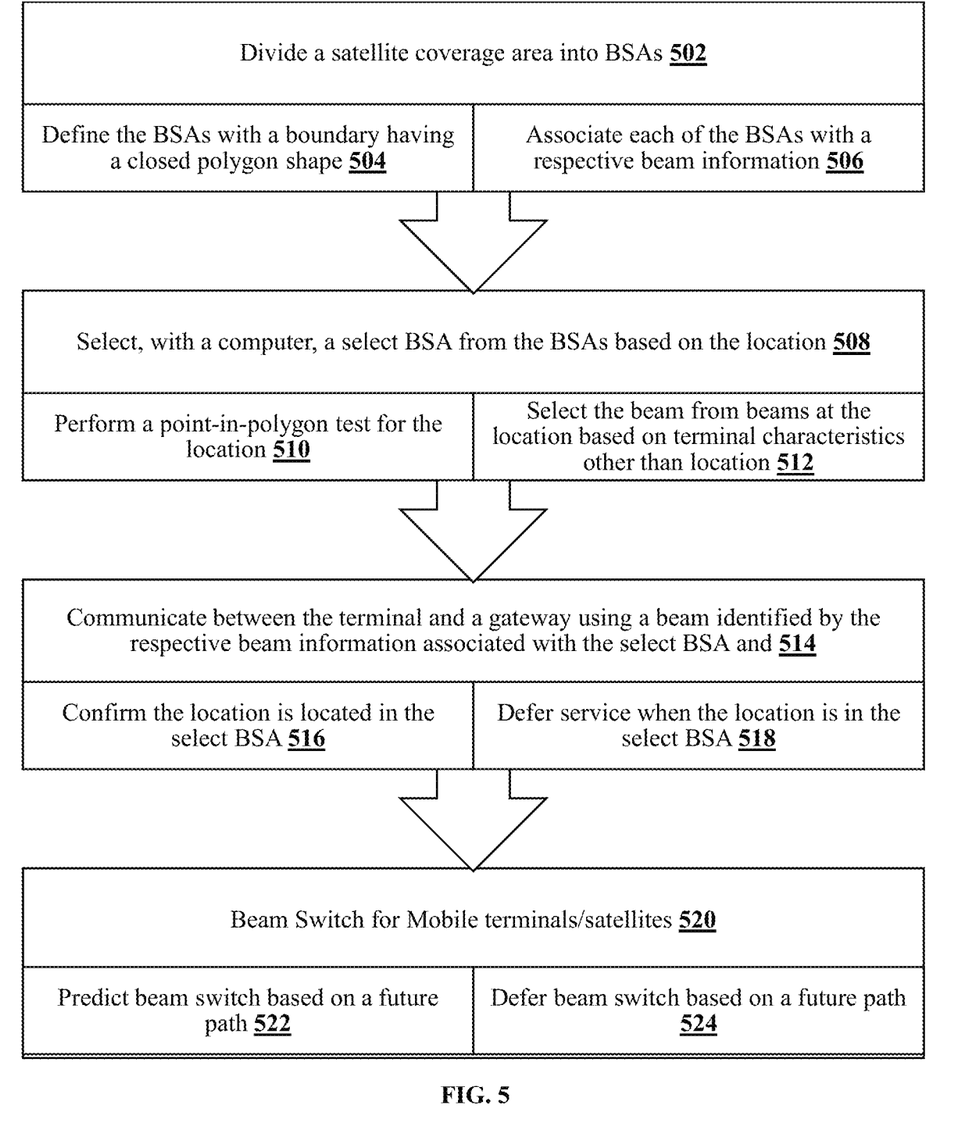
FIG. 5 illustrates an exemplary method for selecting a beam from satellite beams to communicate with a terminal at a location.

FIG. 5 illustrates an exemplary method for selecting a beam from satellite beams to communicate with a terminal at a location.

A method 500 for selecting a beam from satellite beams to communicate with a terminal at a location is disclosed. The method 500 may include operation 502 to divide a satellite coverage area into BSAs. The method 500 may include operation 504 to define the BSAs with a boundary having a closed polygon shape. The method 500 may include operation 506 to associate each of the BSAs with a respective beam information. The method 500 may include operation 508 to select, with a computer, a select BSA from the BSAs based on the location. The method 500 may include operation 510 to perform a point-in-polygon test for the location. The method 500 may include operation 512 to select the beam from beams at the location based on terminal characteristics other than location 512.

The method 500 may include operation 514 to communicate between the terminal and a gateway using a beam identified by the respective beam information associated with the select BSA. The method 500 may include operation 516 to confirm that the location is located in the select BSA. The method 500 may include operation 518 to defer service when the location is in the select BSA. The method 500 may include operation 520 to beam switch for Mobile terminals/satellites. The method 500 may include operation 522 to predict beam switch based on a future path. The method 500 may include operation 524 to defer beam switch based on a future path.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A method for selecting a beam from satellite beams to communicate with a terminal at a location, the method comprising:
   dividing a satellite coverage area into Beam Service Areas (BSAs) for a satellite network, wherein each of the BSAs is associated with a respective beam information;
   selecting, with a computer, a select BSA from the BSAs based on the location; and
   communicating between the terminal and a gateway using a beam,
   wherein the location is located in the select BSA,
   the beam is identified by the respective beam information associated with the select BSA, and
   the BSAs define a boundary having a closed polygon shape, wherein the boundary is not an actual boundary of radio frequency signals defining the beam.

2. The method of claim 1, wherein the select BSA coincides with a country boundary.

3. The method of claim 1, wherein a plurality of the BSAs are located within a country boundary.

4. The method of claim 1, wherein one of the BSAs comprises a no-transmit region due to the respective beam information identifying an unavailable beam.

5. The method of claim 1, wherein the beam spans multiple BSAs of the BSAs with a Effective Isotropic Radiated Power (EIRP) above some required minimum.

6. The method of claim 1, further comprising denying communications with the beam to the terminal when the location is outside the select BSA.

7. The method of claim 1, wherein a first BSA of the BSAs is enclosed by a second BSA of the BSAs.

8. The method of claim 1, wherein the terminal is one or more of an aeronautical, a maritime or a mobile terminal.

9. The method of claim 1, wherein the selecting comprises performing a point-in-polygon test on the location.

10. The method of claim 1, wherein the selecting is performed by the terminal.

11. The method of claim 1, wherein the selecting is performed at an external beam selector.

12. The method of claim 1, wherein the selecting is based on a characteristic of the terminal selected from one or more of a heading, a speed, a beam definition plan version, an antenna directivity, a radome, a skew angle, and a terminal identification.

13. The method of claim 1, further comprising wherein the respective beam information comprises one or more of the location, a service agreement, a terminal capability, a beam modulation, a terminal provisioning and a beam identifier.

14. The method of claim 1, further comprising sending the respective beam information to the terminal.

15. The method of claim 1, further comprising predicating a beam switch when a future path of the terminal approaches a boundary of the select BSA.

16. The method of claim 1, further comprising deferring a beam switch, when a future path of the terminal approaches a boundary of the select BSA and the future path remains within a boundary area defined by the boundary and an inner boundary of the select BSA.

17. A system to select a beam from satellite beams to communicate with a terminal at a location, the system comprising:
    a satellite coverage area divided into Beam Service Areas (BSAs) for a satellite network, wherein each of the BSAs is associated with a respective beam information;
    a beam selector to select a select BSA from the BSAs based on the location; and
    a transceiver to communicate between the terminal and a gateway using a beam,
    wherein the location is located in the select BSA,
    the beam is identified by the respective beam information associated with the select BSA, and
    the BSAs define a boundary having a closed polygon shape, wherein the boundary is not an actual boundary of radio frequency signals defining the beam.

18. The system of claim 17, further comprising a gateway to deny communications with the beam to the terminal when the location is outside the select BSA.

19. The system of claim 17, wherein the terminal includes the beam selector.

20. The system of claim 17, wherein the beam selector defers a beam switch, when a future path of the terminal approaches a boundary of the select BSA and the future path remains within a boundary area defined by the boundary and an inner boundary of the select BSA y.

* * * * *